Feb. 16, 1926.

R. RUTZ

TIRE TOOL

Filed March 26, 1925

1,573,581

Inventor
Roy Rutz

By D. Swift

Attorney

Patented Feb. 16, 1926.

1,573,581

UNITED STATES PATENT OFFICE.

ROY RUTZ, OF NAVARRE, KANSAS.

TIRE TOOL.

Application filed March 26, 1925. Serial No. 18,505.

*To all whom it may concern:*

Be it known that I, ROY RUTZ, a citizen of the United States, residing at Navarre, in the county of Dickinson, State of Kansas, have invented a new and useful Tire Tool; and I do hereby declare the following to be a full, clear, and exact description of the invention, such as will enable others skilled in the art to which it appertains to make and use the same.

The invention relates to tire tools, and has for its object to provide a device of this character comprising crossed members pivoted together and adapted to be inserted under the clincher flanges of an automobile tire, when the crossed members are in registration, and to be spread apart after the tool is inserted for raising the clincher flange at spaced points, thereby allowing the tire to be easily removed from a rim upon a prying operation.

A further object is to provide the crossed members with looped handle members adapted to be gripped by the operator, and which looped handle members are provided with lugs overlying adjacent sides of the members for limiting the pivotal action thereof in one direction with the members in registration. Also to provide the outer ends of the pivoted members with curved portions for facilitating the insertion of the tool when in closed position under the tire flange.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figures 1, 2, 3:
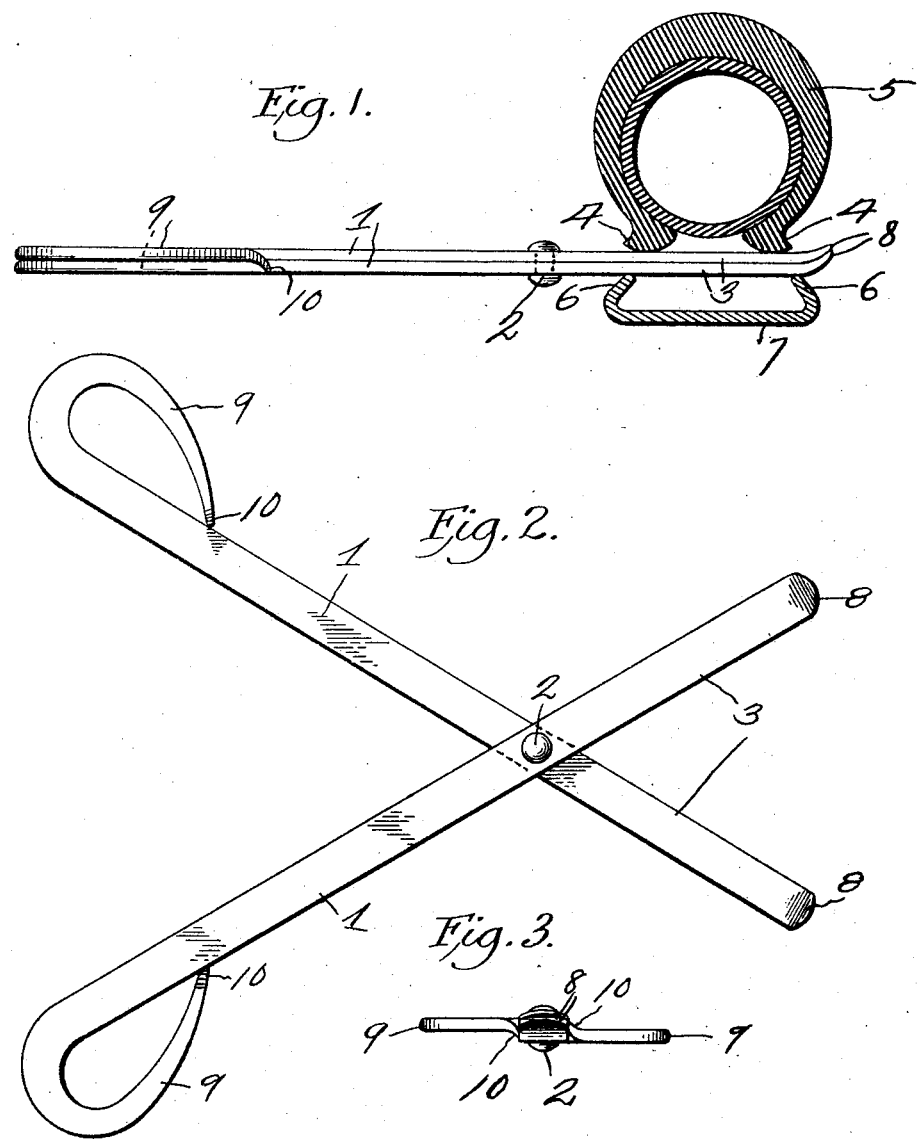
Figure 1 is a vertical transverse sectional view through a conventional form of rim, showing the tool applied thereto.
Figure 2 is a top plan view of the tire tool, showing the members in open position for a prying operation.
Figure 3 is a front elevation of the tool.

Referring to the drawing the numeral 1 designates crossed members, which members are pivotally connected together at 2, thereby forming arms 3, adapted to be forced under the clincher flanges 4 of a tire casing 5, and over the flanges 6 of the rim 7, as shown in Figure 1 for imparting a prying operation on the side of the tire 5 for removing the same from the rim. When the tool is inserted the arms 3 are in registration with each other, thereby allowing the curved ends 8 thereof to be easily forced under the flanges 4. However after the arms 3 are forced to the proper position under the flanges 4, the operator grasps the looped handle members 9 and forces them apart to the position shown in Figure 2, which action will spread the arms 3 to the diverging positions shown in Figure 2, thereby raising the clincher flange 4 at spaced points and allowing the tire to be more easily and readily removed from the demountable rim upon a downward prying movement of the handle ends of the tool while in spread position. It has been found that a tire casing can be easily and quickly removed from or placed on a rim with the tool, and a two point bearing at relatively spaced points is provided in the prying operation consequently the tire casing is more easily removed. At the present time this is attempted with two separate tools. However where two separate tools are used, the operator experiences considerable difficulty in holding one tool while inserting and imparting a prying action on the other tool, consequently the removal of a tire casing requires considerable time and labor, and a relatively strong operator. The looped handle members 9 are formed integral with the crossed members 1 and are preferably provided with outwardly bent ends 10, which ends engage the outer sides of the crossed members 1 for limiting the same to registering positions and preventing the inward movement of the members when folded to closed positions.

From the above it will be seen that a tire removing tool is provided, which is simple in construction, the parts reduced to a minimum, and one wherein, when the tool is forced under a tire and spread apart, spaced bearing points will be obtained during the prying operation for facilitating the removal of the tire casing.

The invention having been set forth what is claimed as new and useful is:

A tire tool comprising pivotally connected crossed handle members, outwardly curved ends carried by the handle members, looped handle members carried by one of the ends of the crossed handle members, said looped handle members terminating in oppositely bent ends adapted to engage opposite sides of the crossed handle members for limiting the movement of the handle members in one direction after they have reached registering positions and the curved ends are in registration.

In testimony whereof I have signed my name to this specification.

ROY RUTZ.